US011533090B1

(12) United States Patent
You et al.

(10) Patent No.: US 11,533,090 B1
(45) Date of Patent: Dec. 20, 2022

(54) METHOD AND SYSTEM FOR DOWNLINK PRE-CODING IN CLOUD RADIO ACCESS NETWORKS

(71) Applicant: HON LIN TECHNOLOGY CO., LTD., Taipei (TW)

(72) Inventors: Yu-Heng You, Hsinchu (TW); Hsuan-Chi Liang, Kinmen County (TW); Shang-Ho Tsai, Hsinchu (TW); Wei-Han Hsiao, Hsinchu (TW); Mykola Servetnyk, Hsinchu (TW)

(73) Assignee: HON LIN TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 17/529,457

(22) Filed: Nov. 18, 2021

Related U.S. Application Data

(60) Provisional application No. 63/241,607, filed on Sep. 8, 2021.

(51) Int. Cl.
*H04B 7/02* (2018.01)
*H04B 7/0456* (2017.01)

(52) U.S. Cl.
CPC .................. *H04B 7/0456* (2013.01)

(58) Field of Classification Search
CPC .................................................... H04B 7/0456
USPC ........................................................ 375/267
See application file for complete search history.

(56) References Cited

U.S. PATENT DOCUMENTS

| 10,716,104 B2 * | 7/2020 | Huang | H04W 88/085 |
| 2015/0146565 A1 * | 5/2015 | Yu | H04W 24/10 |
| | | | 370/329 |
| 2015/0372728 A1 * | 12/2015 | Rahman | H04L 5/0007 |
| | | | 370/329 |
| 2017/0257155 A1 * | 9/2017 | Liang | H04B 7/0456 |
| 2019/0254013 A1 * | 8/2019 | Chang | H04L 5/00 |
| 2021/0105125 A1 * | 4/2021 | Rajagopal | H04L 5/0048 |

OTHER PUBLICATIONS

Qi Hou, Shiwen He, Yongming Huang, Haiming Wang, and Luxi Yang, Joint User Scheduling and Hybrid Precoding Design for MIMO C-RAN, 2017 9th International Conference on Wireless Communications and Signal Processing (WCSP), Oct. 2017, Nanjing, China.

* cited by examiner

*Primary Examiner* — Helene E Tayong
(74) *Attorney, Agent, or Firm* — ScienBiziP, P.C.

(57) ABSTRACT

A method and a system for downlink pre-coding in cloud radio access networks uses a baseband unit, a number of remote radio heads, and a number of user equipments. The baseband unit determines a received signal expression for each user equipment based on system parameters and channel state information, and determines a sum rate expression which may be achievable for downlink transmission based on the received signal expression. The baseband unit then sets up a constrained optimal problem expression subject to a maximum transmitting power of each remote radio head with an objective function of sum rate maximization based on the achievable sum rate expression, and finally determines optimal solutions for the constrained optimal problem where the optimal solutions comprise downlink pre-coding used for downlink transmission.

10 Claims, 3 Drawing Sheets

METHOD AND SYSTEM FOR DOWNLINK PRE-CODING IN CLOUD RADIO ACCESS NETWORKS

FIELD

The subject matter herein generally relates to wireless communications, and more particularly, to a method for downlink pre-coding in cloud radio access networks, and a system thereof.

BACKGROUND

In Cloud Radio Access Networks (C-RAN), the capacity of fronthaul network is restricted and limited to reduce the cost of fiber deployment between a baseband unit (BBU) and a plurality of remote radio heads (RRHs). Since the fronthaul load increases with the number of RRHs, reducing the fronthaul loading is an issue.

BRIEF DESCRIPTION OF THE DRAWINGS

Implementations of the present technology will now be described, by way of embodiment, with reference to the attached figures, wherein.

DETAILED DESCRIPTION

Figure 1:
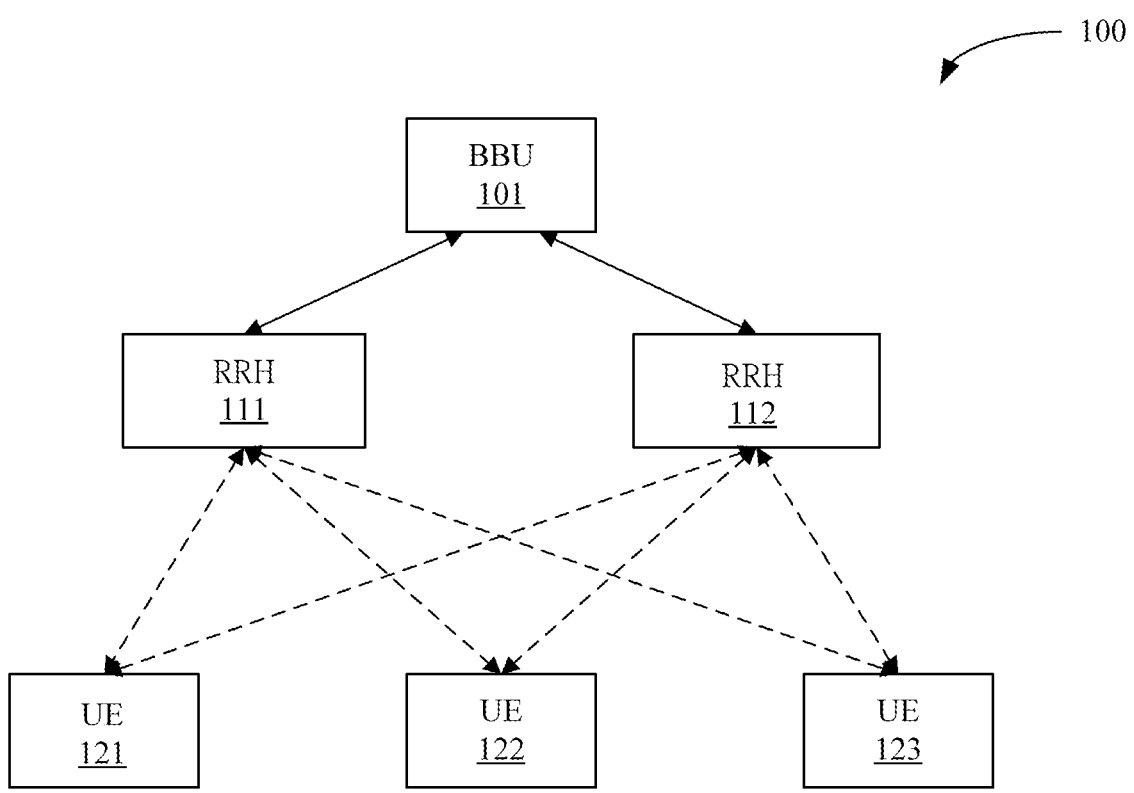
FIG. 1 is a schematic diagram of one embodiment of a system for downlink pre-coding signals in cloud radio access networks.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a system 100 for downlink pre-coding in cloud radio access networks. The system 100 comprises at least one baseband unit (BBU) 101 and a plurality of remote radio heads (RRHs) 111 and 112. Each of the RRHs 111 and 112 is connected to the BBU 101 through a fronthaul link. In the system 100, the RRHs 111 and 112 provide wireless communication services for a plurality of user equipments (UEs) 121-123. The number of RRHs 121-123 and UEs 131-133 in FIG. 1 is for illustrative purposes only. For example, although the system 100 in FIG. 1 contains two RRHs, in practice, the number of RRHs can be set according to requirements.

In downlink stage, the BBU 101 communicates wirelessly with K UEs through N RRHs. In one embodiment, each UE is equipped with one single antenna and each RRH is equipped with $M_t$ transmitting antennas and $N_{RF}$ RF chains, where $N_{RF} < M_t$. The system 100 is therefor unable to use entirely digital beamforming technique and requires the hybrid analog-digital beamforming methods.

Since the signal model of the system 100 comprises many symbols, the data transmission to the $UE_1$ in the downlink is illustrated as an example.

In one embodiment, the channel state information (CSI) is known by the BBU 101. The BBU 101 first digitally pre-codes the signals to be transmitted to the UE with the digital pre-coding matrix corresponding to the RRHs, then quantizes the digitally pre-coded signals, and finally transmits analog pre-coding matrix and the quantized signals to the corresponding RRHs through fronthaul links of limited capacity. Each RRH receives the analog pre-coding matrix and the quantized signals, then performs analog pre-coding and transmits the analog pre-coded signals to the UE.

Figure 2:
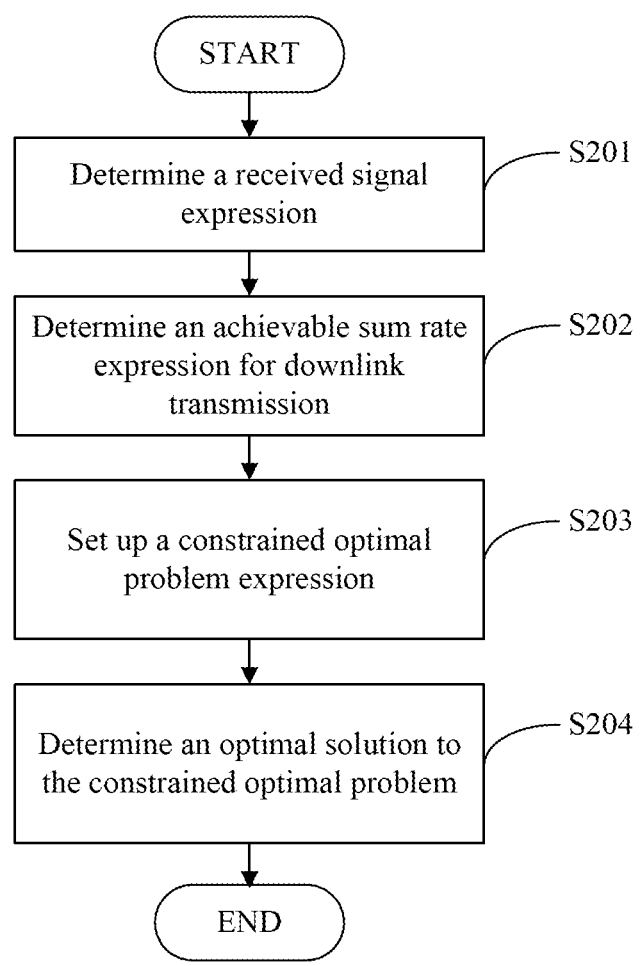
FIG. 2 is a flow chart of one embodiment of a method for the downlink pre-coding in cloud radio access networks.

FIG. 2 illustrates a flow chart of a method for downlink pre-coding in a C-RAN. The method can be implemented in the BBU 101.

At step S201, the BBU determines a signal expression received at the UEs side based on system parameters setting and CSI.

In one embodiment, the system parameters comprise a number of the RRHs, a number of transmitting antennas, and a number of RF chains of each of the plurality of RRHs, a number of UEs, and a number of antennas of the UEs.

Taking the system 100 in FIG. 1 as an example, there are N RRHs and K UEs in the system 100. According to CSI, $h_1^H = [h_{1,1}^H \ h_{1,2}^H]$ is used to represent the channel matrix of $UE_1$, where $h_{k,n}$ is used to represent the channel gain coefficients from the N RRHs to the K UEs.

$$F^{RF} = \begin{bmatrix} F_1^{rf} & 0_{M_t \times N_{RF}} \\ 0_{M_t \times N_{RF}} & F_2^{rf} \end{bmatrix}$$

is used to represent the analog pre-coding matrix used for the $UE_1$, where F is used to represent the analog pre-coding matrix for all the RRHs to the $UE_1$, and $F_n^{rf}$ is used to represent the analog pre-coding matrix for the n th RRH to the $UE_1$.

$$F_1^{BB} = \begin{bmatrix} [F_1^{bb}]_{:,1} & 0_{N_{RF} \times 1} \\ 0_{N_{RF} \times 1} & [F_2^{bb}]_{:,1} \end{bmatrix}$$

is used to represent the digital pre-coding matrix for all the RRHs and the $UE_1$, and $F_n^{bb}$ is used to represent the digital pre-coding matrix for the n th RRH, and $[F_n^{bb}]_{:,k}$ is used to represent the digital pre-coding matrix for the n th RRH and k th UE. The received signal $y_1$ of the $UE_1$ can be expressed in the form of $$y_1 = h_1^H F^{RF} F_1^{BB} s_1 + h_1^H F^{RF} \sum_{l \neq 1}^{3} F_l^{BB} s_l + h_1^H F^{RF} q + n_1,$$

where $s_1$ is the original signal that the BBU wants to transmit to the $UE_1$, $h_1^H F^{RF} F_1^{BB} s_1$ is the desired received signal, $$h_1^H F^{RF} \sum_{l \neq 1}^{3} F_l^{BB} s_l$$

is the inter-UE interference, $h_1^H F^{RF} q$ is the quantization noise, $n_1$ is the channel noise, and $(*)^H$ is used to represent the conjugate transpose of the matrix. Similarly, the received signal $y_k$ of the k th UE can be expressed in the form of $$y_k = h_k^H F^{RF} F_k^{BB} s_k + h_k^H F^{RF} \sum_{l \neq 1}^{K} F_l^{BB} s_l + h_k^H F^{RF} q + n_k.$$

At step S202, the BBU determines a sum rate expression which may be achievable for downlink transmission at the UEs side based on the received signal expression, where the achievable sum rate expression comprises a digital pre-coding matrix, an analog pre-coding matrix, and a quantization noise term.

According to the received signal $y_k$ expression of the k th UE, the achievable rate $C_k$ of downlink transmission of the k th UE can be expressed as $C_k = \log_2(1 + \sigma_{s_k}^2 h_k^H F^{RF} F_k^{BB} F_k^{BB^H} F^{RF^H} h_k J_k^{-1})$, where $J_k$ is the interference plus noise covariance term, and specifically, $$J_k = h_k^H F^{RF} \left( \sum_{l \neq k}^{K} F_l^{BB} F_l^{BB^H} \right) F^{RF^H} h_k + h_k^H F^{RF} \Omega F^{RF^H} h_k + \sigma_{n,k}^2,$$

and $\sigma_{n,k}^2$ is the quantization noise power of the k th UE. $\Omega$ is the quantization noise covariance matrix of the RRHs. Based on the achievable rate of the k th UE, the expression of the achievable sum rate for the downlink transmission is $$\sum_{k=1}^{K} C_k.$$

At step S203, the BBU sets up a constrained optimal problem expression subject to a maximum transmitting power of each of the RRHs with an objective function of sum rate maximization based on the achievable sum rate expression. The constrained optimal problem expression comprises digital pre-coding matrix optimization, analog pre-coding matrix optimization, and quantization noise term optimization.

To optimize the digital pre-coding matrix ($F_k^{BB}$), the analog pre-coding matrix ($F^{RF}$), and the quantization noise term ($\Omega$) the constrained optimization problem can be expressed by the following equation:

$$(F^{RF}, F_k^{BB}, \Omega) = \underset{F^{RF}, F_k^{BB}, \Omega}{\operatorname{argmax}} \sum_{k=1}^{K} C_k,$$

where $F^{RF}$ and $F_k^{BB}$ are block diagonals.

At step S204, the BBU determines an optimal solution for a digital pre-coding matrix, an optimal solution for an analog pre-coding matrix, and an optimal solution for a quantization noise term in the constrained optimal problem.

Since the capacity of the fronthaul links is limited, the BBU can configure a budget for quantization bits for each RRH based on the UEs served by the RRH. In one embodiment, each RRH equally allocates quantization bits based on the quantization bits budget. In another embodiment, each RRH allocates quantization bits to each served UE based on the quantization bits budget and a bit allocation algorithm. Since the number of bits used for quantization determines the quantization error, increasing the number of quantization bits effectively reduces quantization noise, while taking into account the bits limitation of the fronthaul links. In one embodiment, the optimization of quantization noise can be achieved by optimizing the allocation of the quantization bits.

Figure 3:
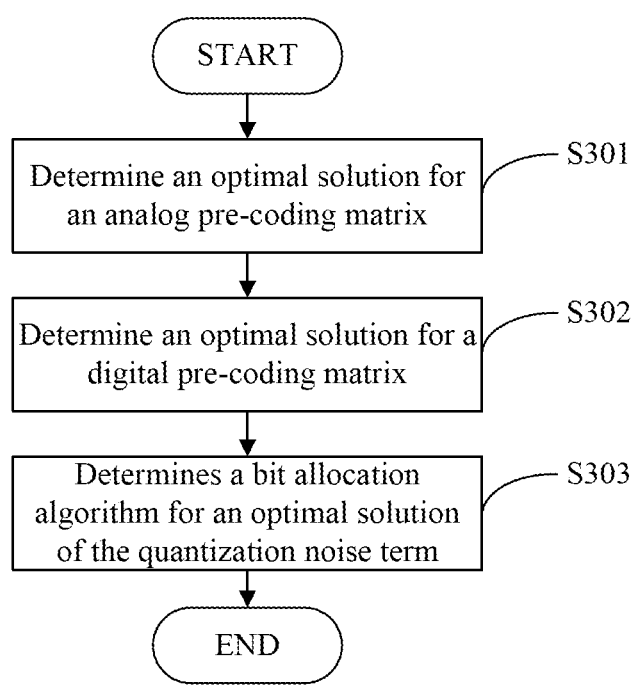
FIG. 3 is a sub-flow chart of step 5204 of the method of FIG. 2.

If the digital pre-coding matrix, the analog pre-coding matrix, and the quantization bits allocation are to be solved simultaneously for the constrained optimal problem, the solution process is too complicated. Therefore, the following steps are used to solve the constrained optimal problem, the corresponding flow chart is illustrated in FIG. 3.

At step S301, the BBU configures the digital pre-coding matrix as a known fixed value and determines the optimal solution for the analog pre-coding matrix based on the configured digital pre-coding matrix.

At step S302, the BBU determines the optimal solution for the digital pre-coding matrix based on the determined analog pre-coding matrix.

At step S303, the BBU determines a bit allocation algorithm for the optimal solution of the quantization noise term based on the determined analog pre-coding matrix and the determined digital pre-coding matrix.

The step S301 further comprises the following sub-steps:

(1) The BBU initializes the digital pre-coding matrix to render the product of the digital pre-coding matrix and a conjugate transpose of the digital pre-coding matrix equal to a unit matrix, that is $F_k^{BB} F_k^{BB^H} = I$.

(2) The BBU ignores the quantization noise in the interference plus noise covariance term, i.e., the new $$J_k = h_k^H F^{RF} \left( \sum_{l \neq k}^{K} F_l^{BB} F_l^{BB^H} \right) F^{RF^H} h_k + \sigma_{n,k}^2.$$

(3) The BBU utilizes a column-wise iteration method to determine the optimal solution for the analog pre-coding matrix $F^{RF}$.

The computation procedure of the column-wise iteration method is as follows:

The $F^{RF}$ to be solved is expressed as $$\begin{bmatrix} F_1^{rf} & 0_{M_t \times N_{RF}} & 0_{M_t \times N_{RF}} \\ 0_{M_t \times N_{RF}} & O & 0_{M_t \times N_{RF}} \\ 0_{M_t \times N_{RF}} & 0_{M_t \times N_{RF}} & F_N^{rf} \end{bmatrix},$$

letting $v_{i,j}$ denote the lth column vector, where $l=(i-1)N_{RF}+j, i \in \{1, \ldots, N\}, j \in \{1, \ldots, N_{NF}\}$, and $\overline{V}_{i,j}$ is the sub-matrix of the $F^{RF}$ after removing the column vector $v_{i,j}$ from the $F^{RF}$, i.e., the $\overline{V}_{i,j} = F^{RF} \setminus v_{i,j}$.

Starting from the first column vector, the optimal solution for an m th element of the $v_{i,j}$ is computed, and then the optimal solution for an m+1 th element is computed until the optimal solutions are obtained for all the elements of the $v_{i,j}$. All elements of the next column vector column-wise are iterated until the optimal solution is obtained for all the column vectors of the $F^{RF}$.

The optimal solution for the m th element of the $v_{i,j}$ can be computed by the following equation:

$$[v_{i,j}]_m = \underset{[v_{i,j}]_m}{\operatorname{argmax}} \prod_{k=1}^{K} \Re \left\{ \sigma_{s_k}^2 J_k^{-1} \left( \sum_{n \neq m} [\tilde{D}_{i,j,k}]_{m,n} [v_{i,j}]_n \right) [v_{i,j}]_m \right\},$$

where $$\tilde{D}_{i,j,k} = h_k h_k^H - \frac{\sigma_{s_k}^2 h_k h_k^H \overline{V}_{i,j} (D_{i,j,k})^{-1} \overline{V}_{i,j}^H h_k^H h_k}{J_k},$$

$$D_{i,j,k} = I - \frac{\sigma_{s_k}^2 \overline{V}_{i,j} h_k h_k^H \overline{V}_{i,j}^H}{J_k},$$

and $\Re\{a\}$ denotes the real part of the complex number a.

Since an optimal solution for the $F^{RF}$ has been obtained, in step S302, the constrained optimal problem can be reformulated as the following equation:

$$(F_k^{BB}) = \underset{F_k^{BB}}{\operatorname{argmax}} \sum_{k=1}^{K} C_k.$$

In one embodiment, since there is only one variable in the reformulated constrained optimal problem, a weighted minimum mean square error (WMMSE) iteration method can be used to compute the optimal solution for the $F_k^{BB}$. Specifically, considering the inter-UE interference, the BBU computes an MMSE-receiver and an MSE-matrix of the k th UE to obtain a digital pre-coding matrix for the k th UE. The digital pre-coding matrix for all the UEs can be obtained by iterating in the same way. The WMMSE is a well-known method, so the detailed steps of the method are not discussed here.

In another embodiment, in step S302, the optimal solution for the digital pre-coding matrix is determined using an interference cancellation method, comprising the following steps:

(1) The BBU treats the $h_k^H F^{RF}$ as an equivalent channel.

(2) The BBU computes the optimal solution of the digital pre-coding matrix using a block diagonalization (BD) method to eliminate the interference-related terms in the constrained optimal problem.

Specifically, since the optimal solution for the $F^{RF}$ is already known, the BBU further treats the $h_k^H F^{RF}$ as an equivalent channel. That is, $\tilde{h}_k^H = h_k^H F^{RF}$, where $\tilde{h}_k^H = [\tilde{h}_{k,1}^H, \ldots, \tilde{h}_{k,N}^H]$.

To eliminate interference between the UEs, the $[F_n^{BB}]_{:,k}$ are designed based on the null space of the interference channels of other UEs. Therefore, the following equation is computed to obtain the $[F_n^{bb}]_{:,k}$:

$[F_n^{bb}]_{:,k} = Y_{k,n}$, where $Y_{k,n}$ is the null space for other UEs to interfere with the channel, $c_{k,n}$ is the coefficient vector, $$c_{k,n} = \frac{Y_{k,n}^H \tilde{h}_{k,n}}{\|Y_{k,n}^H \tilde{h}_{k,n}\|}, \tilde{h}_k = [\tilde{h}_{k,1}, \ldots, \tilde{h}_{k,N}], \text{ and } \tilde{h}_k = F^{RF^H} h_k.$$

After the optimal solutions are obtained for both the analog pre-coding matrix and the digital pre-coding matrix, in step S303, the bit allocation algorithm can be further used to obtain the optimal solution for $\Omega$, and the optimal problem can be reformulated as the following equation after the $F^{RF}$ and $F_k^{BB}$ are obtained:

$$(\Omega) = \underset{\Omega}{\operatorname{argmax}} \sum_{k=1}^{K} C_k,$$

where the constraint is the quantization bits budget $B_n$ for each RRH, and $\Omega$ is subject to $$\sum_{k=1}^{K} -\log_2 \frac{6[\Omega_n]_{k,k}}{s_D^2} = B_n,$$

and $$[\Omega_n]_{k,k} = \frac{s_D^2 2^{-b_{n,k}}}{6}.$$

The $S_D$ represents the dynamic range of transmitted symbols, and $b_{n,k}$ represents the number of quantization bits allocated by the n th RRH to the k th UE.

In one embodiment, when the downlink has a high signal to quantization noise ratio (SQNR) and the quantization bits budget is sufficient, the bits allocation optimal problem can be further reformulated as the following equation:

$$(\text{number of allocated bits}) \approx \underset{\sigma_{n,k}^2}{\min} \prod_{k=1}^{K} \left( \sum_{n=1}^{N} h_{k,n}^H [F_n^{rf}]_{:,k} \sigma_{n,k}^2 [F_n^{rf}]_{:,k}^H h_{k,n} \right),$$

where the constraint is the quantization bits budget $B_n$ for each RRH, and $\Omega$ is subject to:

$$\sum_{k=1}^{K} -\log_2 \frac{6[\Omega_n]_{k,k}}{s_D^2} = B_n, \text{ and } [\Omega_n]_{k,k} = \frac{s_D^2 2^{-b_{n,k}}}{6}.$$

In one embodiment, the BBU uses Lagrange multiplier method to implement the bit allocation algorithm. Taking three UEs for example, the optima number of bits allocated for the first UE is $$[\Omega_n]_{1,1} = \sqrt{\frac{(s_D^2)^3 \left|[F_n^{rf}]_{:,2}^H h_{2,n}\right|^2 \left|[F_n^{rf}]_{:,3}^H h_{3,n}\right|^2 g_{n,1} 2^{-B_n}}{6^3 \left|[F_n^{rf}]_{:,1}^H h_{1,n}\right|^2 g_{n,2} g_{n,3}}},$$

the optimal number of bits allocated for the second UE is $$[\Omega_n]_{2,2} = \sqrt{\frac{(s_D^2)^3 \left|[F_n^{rf}]_{:,1}^H h_{1,n}\right|^2 \left|[F_n^{rf}]_{:,3}^H h_{3,n}\right|^2 g_{n,2} 2^{-B_n}}{6^3 \left|[F_n^{rf}]_{:,2}^H h_{2,n}\right|^2 g_{n,1} g_{n,3}}},$$

and the optimal number of bits allocated for the third UE is $$[\Omega_n]_{3,3} = \sqrt{\frac{(s_D^2)^3 \left|[F_n^{rf}]_{:,1}^H h_{1,n}\right|^2 \left|[F_n^{rf}]_{:,2}^H h_{2,n}\right|^2 g_{n,3} 2^{-B_n}}{6^3 \left|[F_n^{rf}]_{:,3}^H h_{3,n}\right|^2 g_{n,1} g_{n,2}}},$$

where $$g_{n,k} = \prod_{\substack{i=1 \\ i \neq n}}^{N} h_{k,i}^H [F_n^{rf}]_{:,k} \sigma_{q_{i,k}}^2 [F_n^{rf}]_{:,k}^H h_{k,i}$$

is used as a fixed parameter representing the number of quantization bits allocated by other RRHs.

In one embodiment, with a high SQNR and an efficient quantization bits budget, when the number of the UEs is larger than 3, the bit allocation algorithm being implemented by using the Lagrange multiplier method makes the UEs affect each other, so the bit allocation algorithm is implemented by the Lagrange multiplier iterative method instead. Specifically, for K UEs served by each RRH, each iteration randomly selects at most 1 UEs to perform the bit allocation algorithm using the Lagrange multiplier method until the bit allocation is completed for all the UEs.

In summary, the system and the method for downlink pre-coding in the C-RAN can achieve an optimal digital pre-coding matrix, an optimal analog pre-coding matrix, and an optimal quantization bits allocation algorithm with an objective function of sum rate maximization under the constraint of the maximum transmitting power of each RRH.

The embodiments shown and described above are only examples. Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for downlink pre-coding for a system in cloud radio access networks, the system comprising a baseband unit and a plurality of remote radio heads, wherein the baseband unit is connected to the plurality of remote radio heads (RRHs) through fronthaul links, the baseband unit is connected to a plurality of user equipments through wireless communication from the plurality of RRHs, wherein the baseband unit is configured to perform:
   determining a received signal expression for each of the plurality of user equipments based on system parameters setting and channel state information;
   determining a sum rate expression that is achievable for downlink transmission based on the received signal expression, wherein the sum rate expression comprises a digital pre-coding matrix, an analog pre-coding matrix, and a quantization noise term;
   setting up a constrained optimal problem expression subject to a maximal transmitting power of each of the plurality of RRHs with an objective function of sum rate maximization based on the achievable sum rate expression, wherein the constrained optimal problem expression comprises digital pre-coding matrix optimization, analog pre-coding matrix maximization, and quantization noise term optimization; and
   determining an optimal solution of the digital pre-coding matrix, an optimal solution of the analog pre-coding matrix, and an optimal solution of the quantization noise term based on the constrained optimal problem expression.

2. The method of claim 1, wherein the system parameters comprise: a number of the plurality of RRHs, a number of transmitting antennas, a number of radio frequency chains of each of the plurality of RRHs, a number of the plurality of user equipments, and a number of antennas of each of the plurality of user equipments.

3. The method of claim 1, wherein the baseband unit is further configured to perform:
   utilizing an optimal allocation of quantization bits as the optimal solution of the quantization noise term.

4. The method of claim 3, wherein the determining an optimal solution of the digital pre-coding matrix, an optimal solution of the analog pre-coding matrix, and an optimal solution of the quantization noise term based on the constrained optimal problem expression further comprises:
   configuring the digital pre-coding matrix as a known fixed value;
   determining the optimal solution for the analog pre-coding matrix based on the configured digital pre-coding matrix;
   determining the optimal solution for the digital pre-coding matrix based on the determined optimal solution for the analog pre-coding matrix; and determining a bit allocation algorithm for the optimal solution of the quantization noise term based on the determined optimal solution for the analog pre-coding matrix and the determined optimal solution for the digital pre-coding matrix.

5. The method of claim 4, wherein the configuring the digital pre-coding matrix as a known fixed value further comprises:
   initializing the digital pre-coding matrix.

6. The method of claim 4, wherein the determining the optimal solution for the analog pre-coding matrix based on the configured digital pre-coding matrix further comprises:
   ignoring quantization noise in an interference plus noise covariance term; and
   utilizing a column-wise iteration method to determine the optimal solution for the analog pre-coding matrix.

7. The method of claim 4, wherein the determining the optimal solution for the digital pre-coding matrix based on the determined optimal solution for the analog pre-coding matrix further comprises:

utilizing an interference cancellation method to determine the optimal solution for the digital pre-coding matrix.

8. The method of claim 4, wherein the bit allocation algorithm further comprises:

configuring a quantization bits budget for each of the plurality of RRHs based on the plurality of user equipments served by the each of the plurality of RRHs; and allocating quantization bits to each of the plurality of user equipments based on the quantization bits budget for the each of the plurality of RRHs.

9. The method of claim 8, wherein the allocating quantization bits for each of the plurality of user equipments based on the quantization bits budget for the each of the plurality of RRHs further comprises:

utilizing a Lagrange multiplier iterative method to allocate quantization bits for each of the plurality of user equipments based on the quantization bits budget for the each of the plurality of RRHs.

10. A system for downlink pre-coding in a cloud radio access network, the system comprising a baseband unit and a plurality of remote radio heads, wherein the baseband unit is connected to the plurality of remote radio heads (RRHs) through fronthaul links, the baseband unit is connected to a plurality of user equipments through wireless communication from the plurality of RRHs, wherein the baseband unit is configured to perform:

determining a received signal expression for each of the plurality of user equipments based on system parameters and channel state information;

determining a sum rate expression that is achievable for downlink transmission based on the received signal expression, wherein the sum rate expression comprises a digital pre-coding matrix, an analog pre-coding matrix, and a quantization noise term;

setting up a constrained optimal problem expression subject to a maximal transmitting power of each of the plurality of RRHs with an objective function of sum rate maximization based on the achievable sum rate expression, wherein the constrained optimal problem expression comprises digital pre-coding matrix optimization, analog pre-coding matrix maximization, and quantization noise term optimization; and determining an optimal solution of the digital pre-coding matrix, an optimal solution of the analog pre-coding matrix, and an optimal solution of the quantization noise term based on the constrained optimal problem expression.

* * * * *